(12) United States Patent
Liu et al.

(10) Patent No.: US 12,605,655 B2
(45) Date of Patent: Apr. 21, 2026

(54) CIRCULAR PLATE PULLING FILTER PRESS

(71) Applicant: Jingjin Equipment Inc., Dezhou (CN)

(72) Inventors: Guozhi Liu, Dezhou (CN); Mingjie Yang, Dezhou (CN); Xin Wang, Dezhou (CN)

(73) Assignee: JINGJIN EQUIPMENT INC., Dezhou (CN)

( * ) Notice: Subject to any disclaimer, the term of this patent is extended or adjusted under 35 U.S.C. 154(b) by 589 days.

(21) Appl. No.: 17/910,218

(22) PCT Filed: Jan. 15, 2021

(86) PCT No.: PCT/CN2021/072043
§ 371 (c)(1),
(2) Date: Sep. 8, 2022

(87) PCT Pub. No.: WO2022/134243
PCT Pub. Date: Jun. 30, 2022

(65) Prior Publication Data
US 2023/0120372 A1 Apr. 20, 2023

(30) Foreign Application Priority Data
Dec. 23, 2020 (CN) .......................... 202011542516.0

(51) Int. Cl.
*B01D 25/164* (2006.01)

(52) U.S. Cl.
CPC ................................. *B01D 25/164* (2013.01)

(58) Field of Classification Search
CPC ..... B01D 25/164; B01D 25/175; B01D 25/12
See application file for complete search history.

(56) References Cited

U.S. PATENT DOCUMENTS 4,179,377 A * 12/1979 Schotten .............. B01D 25/172
210/230
4,181,960 A * 1/1980 Tateishi ............... G01B 3/1084
377/53
(Continued)

FOREIGN PATENT DOCUMENTS

CN 211799066 U 10/2020
CN 211885562 U 11/2020
(Continued)

OTHER PUBLICATIONS

International Search Report for PCT/CN2021/072043 mailed Aug. 30, 2021, ISA/CN.
(Continued)

*Primary Examiner* — Bradley R Spies
*Assistant Examiner* — Jeannie Mcdermott
(74) *Attorney, Agent, or Firm* — Yue (Robert) Xu; Apex Attorneys at Law, LLP

(57) ABSTRACT

A recessed plate filter press for circularly pulling and pushing plates includes a main beam, a thrust plate, multiple filter plates, multiple filter plate handles, multiple plate pulling devices, a push plate, a depressing frame, a chain and multiple sprockets, the thrust plate is arranged on the main beam, and the multiple sprockets are arranged at both ends of the main beam, the chain is installed on the multiple sprockets, the multiple filter plate handles are arranged on both sides of the multiple filter plates, the multiple plate pulling devices are arranged apart on the chain, and the depressing frame is arranged on the push plate, and a plate pulling hook of each plate pulling device is snap-connected with each filter plate handle.

6 Claims, 9 Drawing Sheets

(56) References Cited

U.S. PATENT DOCUMENTS

| | | | | | | |
|---|---|---|---|---|---|---|
| 4,359,385 | A | * | 11/1982 | Krivec | ................. | B01D 25/172 |
| | | | | | | 210/230 |
| 4,362,616 | A | * | 12/1982 | Gehrmann | ........... | B01D 25/172 |
| | | | | | | 210/230 |
| 4,948,501 | A | * | 8/1990 | Klinkau | ............... | B01D 25/215 |
| | | | | | | 210/231 |
| 5,480,543 | A | * | 1/1996 | Oelbermann | ........ | B01D 25/172 |
| | | | | | | 210/236 |

FOREIGN PATENT DOCUMENTS

| | | | | |
|---|---|---|---|---|
| CN | 112156512 | A | | 1/2021 |
| DE | 3716461 | C1 | * | 5/1987 |
| DE | 4325055 | A1 | | 2/1995 |
| GB | 1066291 | A | * | 6/1977 |
| JP | S57110305 | A | | 7/1982 |
| JP | S57156106 | U | | 10/1982 |
| JP | H03221104 | A | | 9/1991 |
| JP | 4325055 | B2 | | 9/2009 |

OTHER PUBLICATIONS

European Search Report issued on Oct. 10, 2024 for the European counterpart application No. 21908262.5.
First Office Action dated Feb. 20, 2024 for Japanese patent application No. 2023-511806, English translation provided by Global Dossier.

* cited by examiner

CIRCULAR PLATE PULLING FILTER PRESS

The present application is a National Phase entry of PCT Application No. PCT/CN2021/072043 filed on Jan. 15, 2021, which claims priority to Chinese Patent Application No. 202011542516.0, titled "RECESSED PLATE FILTER PRESS FOR CIRCULARLY PULLING AND PUSHING PLATES", filed on Dec. 23, 2020 with the China National Intellectual Property Administration, which are incorporated herein by reference in their entireties.

FIELD

The present application relates to the technology field of filter presses, in particular to a recessed plate filter press for circularly pulling and pushing plates.

BACKGROUND

A filter press is an important apparatus for separating solids and liquids. Filter plates are closed to form closed filter chambers. The materials form filter cakes in the filter chambers after being filtered, and then the filter plates are pulled to open and unload the filter cakes. The pulling to open and closing of the filter plates is the most basic action of the filter press, which not only determines an operating efficiency of the filter press, but also determines the overall structure of the filter press. In order to improve the efficiency and increase the production, a filter area of the filter press is getting larger and larger, and a more efficient pulling to open and closing of the filter plates is required at market. At present, a plate pulling device for grabbing and pulling the filter plates is generally driven by a chain in the industry of filter presses. This kind of plate pulling device performs multiple reciprocating operations to grab and pull filter plates, which takes a long time, and the plate pulling device has a high operating frequency and is easily damaged.

When the plate pulling device of the existing model pulls one filter plate to the end, the filter plate may rebound after being released by the plate pulling device, so that there is a gap of 5 mm-10 mm between two filter plates, which results in a waste of about 10% of the filter area when being calculated based on the thickness of the conventional common filter plate of 60 mm-90 mm, and it is required to increase an operating stroke of a hydraulic cylinder to compress the filter plate, resulting in ineffective waste of production costs and operating time.

Therefore, how to improve the processing capacity of the filter press is a technical problem to be solved urgently by those skilled in the art.

SUMMARY

The purpose of the present application is to provide a recessed plate filter press for circularly pulling and pushing plates, which can reduce the working strength of a plate pulling device and improve the processing capacity of the filter press.

In order to solve the above-mentioned technical problems, a recessed plate filter press for circularly pulling and pushing plates is provided according to the present application. The filter press includes a main beam, a thrust plate, multiple filter plates, multiple filter plate handles, multiple plate pulling devices, a push plate, a depressing frame, a chain and multiple sprockets. The thrust plate is arranged on the main beam, the multiple sprockets are arranged on both ends of the main beam, the chain is installed on the multiple sprockets, and the multiple filter plate handles are arranged on both sides of each filter plate, the multiple plate pulling devices are arranged apart on the chain, the depressing frame is arranged on the push plate, and a plate pulling hook of each plate pulling device is snap-connected with one filter plate handle.

Preferably, each plate pulling device includes a plate pulling frame, a compression spring, a chain pin shaft and a first pin shaft, the plate pulling hook is hinged with the plate pulling frame through the first pin shaft, one end of the compression spring is connected with the plate pulling hook, the other end of the compression spring is connected with the plate pulling frame, and the chain pin shaft is used to connect the plate pulling frame with the chain.

Preferably, the plate pulling device further comprises a second pin shaft, and a limiting through-hole of the plate pulling hook is snap-connected with the second pin shaft to limit a position.

Preferably, a limiting protrusion for installing the compression spring is provided on each of the plate pulling hook and the plate pulling frame.

Preferably, a transition surface, a hook protrusion and an inclined surface of hook are provided on the plate pulling hook, the transition surface is located at a tail end of the plate pulling hook, and the hook protrusion and the inclined surface of hook are located at a front end of the plate pulling hook.

Preferably, a circular shaft is provided on the filter plate handle, and a shaft sleeve is mounted on the circular shaft.

Preferably, a retaining ring for fixing the shaft sleeve is further provided on the filter plate handle.

Preferably, the filter press further includes a chain frame arranged on the main beam, and the chain is configured to slide along the top of the chain frame.

Preferably, the filter press further includes a chain frame arranged on the main beam, and the chain is configured to slide along the top of the chain frame.

Preferably, a bracket is further provided on the main beam, and the bracket is located below the chain frame, and an adjusting bolt and a locking nut are provided on the bracket.

Preferably, the depressing frame is a depressing wheel.

Preferably, a plate locking device is provided on a side of the filter plate handle, the plate pulling hook of the plate pulling device is snap-connected with a connecting rod of the plate locking device, and the plate locking hook of the plate locking device is snap-connected with a circular shaft of the filter plate handle.

Preferably, a positioning frame is provided on the filter plate handle, and an upper stop plate and a lower stop plate are provided on the positioning frame.

The recessed plate filter press for circularly pulling and pushing plates according to the present application includes the main beam, the thrust plate, the multiple filter plates, the multiple filter plate handles, the multiple plate pulling devices, the push plate, the depressing frame, the chain and the multiple sprockets, and the thrust plate is arranged on the main beam, the multiple sprockets are arranged on both ends of the main beam, the chain is installed on the multiple sprockets, the multiple filter plate handles are arranged on both sides of the multiple filter plates, the multiple plate pulling devices is arranged apart on the chain, the depressing frame is arranged on the push plate, and the plate pulling hook of the plate pulling device is snap-connected with the filter plate handle. In the recessed plate filter press for circularly pulling and pushing plates in the present application, the plate pulling device is cyclically pulled through the chain, and the plate pulling hook of the plate pulling device pulls the filter plate handle to drive the filter plate to move, and when reaching the right side, the plate pulling hook pushes a previous filter plate in order to bring the current filter plate and the previous filter plate close to each other. The plate pulling hook pushes the filter plate with gentle force to prevent the filter plate from rebounding. When the filter plates are being pushed together, one of the filter plates is pulled and others of the filter plates are pushed at the same time, the gap between the filter plates is reduced, more filter plates can be provided at the same length, the filter area is larger, and thus the processing capacity of the filter press is improved.

BRIEF DESCRIPTION OF THE DRAWINGS

For more clearly illustrating embodiments of the present application or technical solutions in the conventional technology, the drawings referred to for describing the embodiments or the conventional technology will be briefly described hereinafter. Apparently, the drawings in the following description are only examples of the present application, and for those skilled in the art, other drawings may be obtained based on the provided drawings without any creative efforts.

In FIGS. 1-16, the reference numerals are as follows:
main beam-1, thrust plate-2, filter plate-3, filter plate handle-4, main body-41, circular shaft-42, positioning frame-43, retaining ring-44, shaft sleeve-45, plate locking device-5, plate locking hook-51, connecting rod-52, bracket-53, circular hole-54, plate pulling device-6, plate pulling frame-61, plate pulling hook-62, limiting through-hole-621, transition surface-622, limiting protrusion-623, hook protrusion-624, inclined surface of hook-625, compression spring-63, chain pin shaft-64, first pin shaft-65, second pin shaft-66, push plate-7, depressing frame-8, chain-9, sprocket-10, chain frame-11, bracket-12, adjusting bolt-13, and locking nut-14.

DETAILED DESCRIPTION OF THE EMBODIMENTS

Technical solutions of embodiments of the present application are clearly and completely described hereinafter in conjunction with the drawings of the embodiments of the present application. Apparently, the described embodiments are only some embodiments of the present application, rather than all embodiments. Based on the embodiments in the present application, all of other embodiments, made by the person skilled in the art without any creative efforts, fall into the scope of protection of the present application.

First Embodiment

Figure 1:
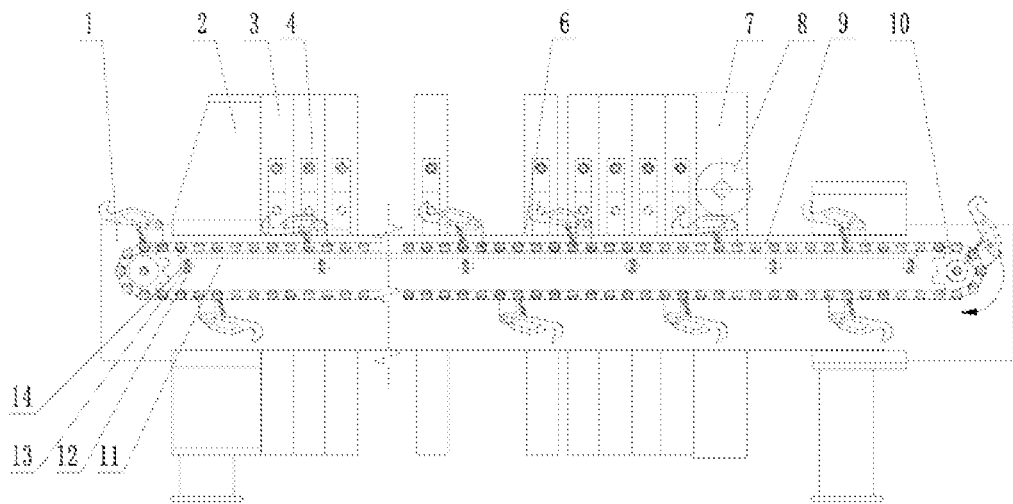
FIG. 1 is a schematic diagram of the overall structure of a specific implementation of a first embodiment according to the present application.
Figure 2:
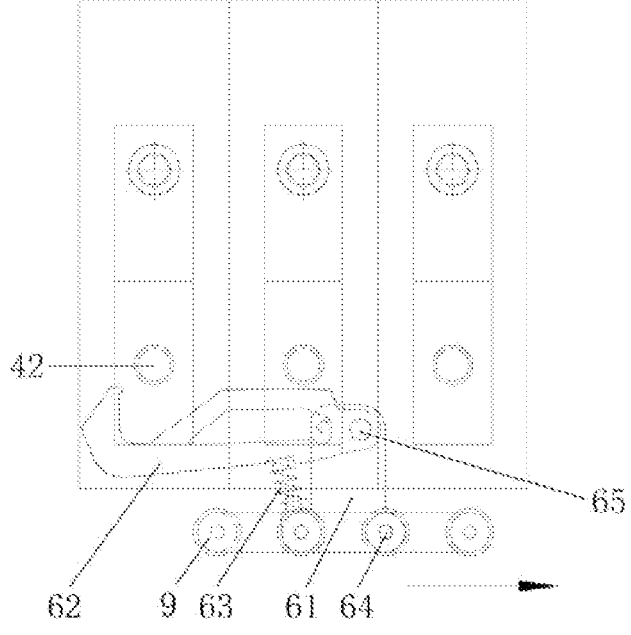
FIG. 2 is a schematic diagram of the operating state in which a plate pulling device is below a filter plate handle shown in FIG. 1.
Figure 3:
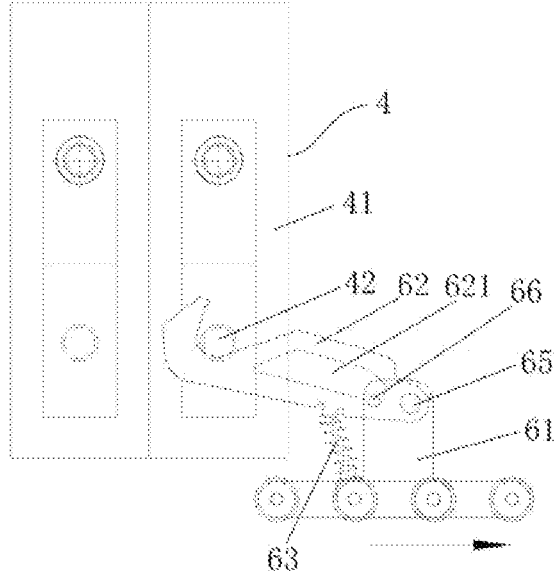
FIG. 3 is a schematic diagram of the operating state in which a plate pulling hook of a plate pulling device is hooked on a filter plate handle shown in FIG. 1.
Figure 4:
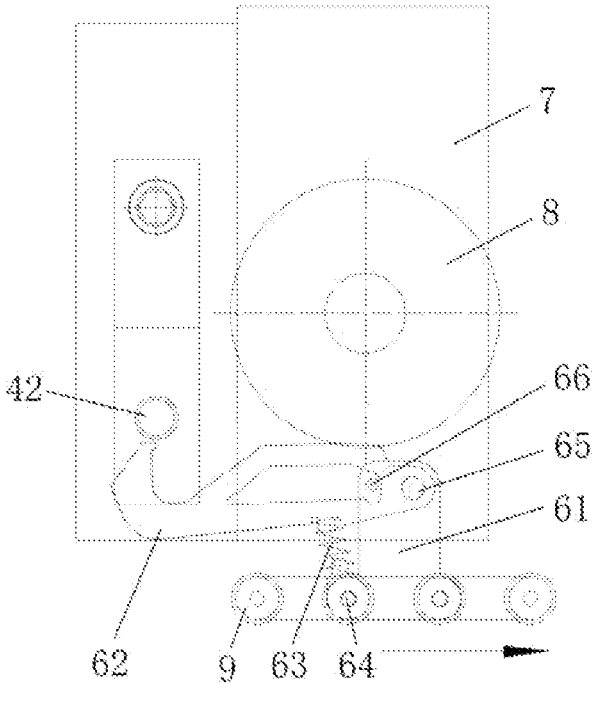
FIG. 4 is a schematic diagram of the operating state in which a plate pulling device touches a depressing frame shown in FIG. 1.
Figure 5:
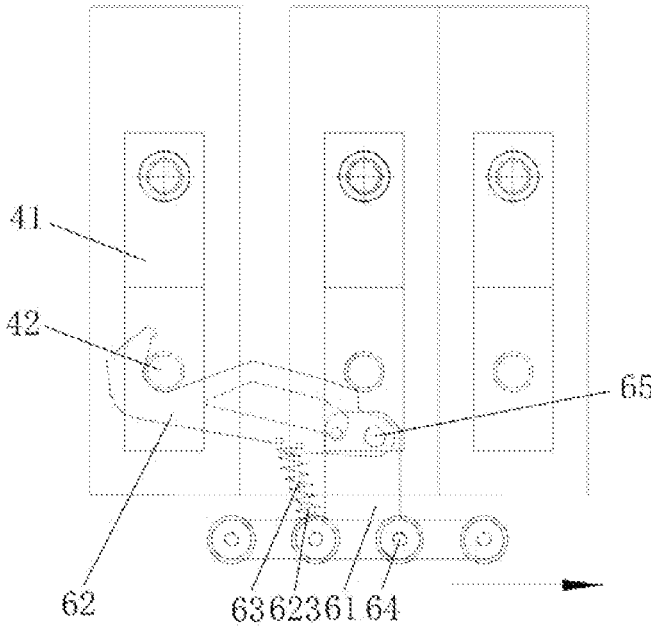
FIG. 5 is a schematic diagram of the operating state in which a plate pulling device pulls a filter plate and pushes the filter plate to close shown in FIG. 1.
Figure 6:
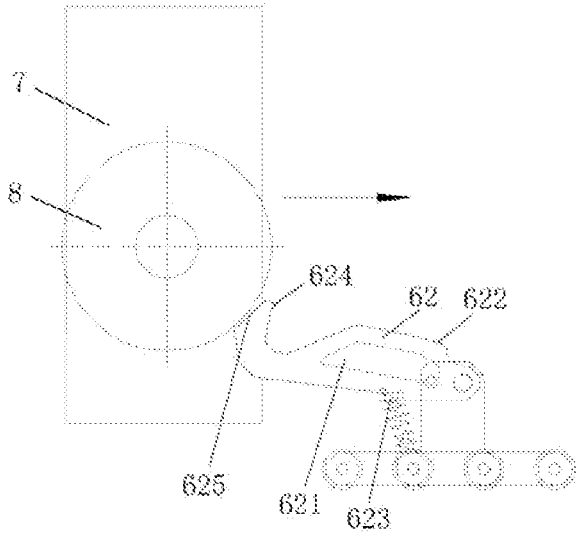
FIG. 6 is a schematic diagram of the operating state in which a push plate is pulled away shown in FIG. 1.
Figure 7:
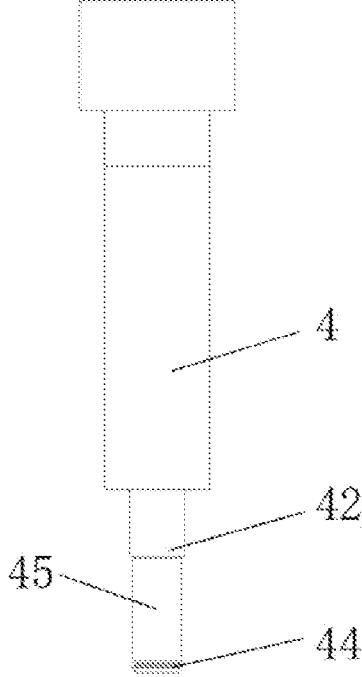
FIG. 7 is a schematic diagram of the structure of a circular shaft shown in FIG. 1.

Reference is made to FIGS. 1-7. FIG. 1 is a schematic diagram of the overall structure of a specific implementation of a first embodiment according to the present application; FIG. 2 is a schematic diagram of the operating state in which a plate pulling device is below a filter plate handle shown in FIG. 1; FIG. 3 is a schematic diagram of the operating state in which a plate pulling hook of a plate pulling device is hooked on a filter plate handle shown in FIG. 1; FIG. 4 is a schematic diagram of the operating state in which a plate pulling device touches a depressing frame shown in FIG. 1; FIG. 5 is a schematic diagram of the operating state in which a plate pulling device pulls a filter plate and pushes the filter plate to close shown in FIG. 1; FIG. 6 is a schematic diagram of the operating state in which a push plate is pulled away shown in FIG. 1; and FIG. 7 is a schematic diagram of the structure of a circular shaft shown in FIG. 1. The arrow in FIGS. 1 to 7 indicates a direction of movement.

In a specific embodiment according to the present application, a main beam 1, a thrust plate 2, multiple filter plates 3, multiple filter plate handles 4, multiple plate pulling devices 6, a push plate 7, a depressing frame 8, a chain 9 and multiple sprockets 10 are mainly included, the thrust plate 2 is arranged on the main beam 1, the multiple sprockets 10 are arranged on both ends of the main beam 1, the chain 9 is installed on the multiple sprockets 10, the filter plate handles 4 are arranged on both sides of the multiple filter plates 3, the multiple plate pulling devices 6 are arranged apart on the chain 9, the depressing frame 8 is arranged on the push plate 7, and a plate pulling hook 62 of each plate pulling device 6 is snap-connected with one filter plate handle 4.

The multiple sprockets 10 are arranged on both ends of the main beam 1, the chain 9 is installed on the multiple sprockets 10, the multiple sprockets 10 are used to drive the chain 9 to rotate, the filter plate handles 4 are arranged on both sides of the multiple filter plates 3, the filter plate handles 4 are used to drive the multiple filter plates 3 to move, the multiple plate pulling devices 6 are arranged apart on the chain 9, the multiple plate pulling devices 6 is used to pull the multiple filter plates 3, the depressing frame 8 is arranged on the push plate 7, the push plate 7 is used to block the filter plate 3 for which the materials are loaded from further moving, and the plate pulling hook 62 of the plate pulling device 6 is snap-connected with the filter plate handle 4.

Specifically, in the actual application process, a power source drives the multiple sprockets 10 to rotate, the multiple sprockets 10 drive the chain 9 installed on the multiple sprockets 10 to rotate cyclically, and the chain 9 drives the multiple plate pulling devices 6 installed on the chain 9 to move. The plate pulling hook 62 of each plate pulling device 6 moved from an end of the thrust plate 2 is depressed by the filter plate handle 4, the plate pulling device 6 passes through a position that is below the filter plate handle 4. When the plate pulling device 6 moves to a position which is below the filter plate handle 4 of the outermost filter plate 3 of the multiple filter plates placed side by side, the filter plate handle 4 loses the restriction on the plate pulling hook 62, the plate pulling hook 62 is reset and then hooks the filter plate handle, the plate pulling hook 62 of the plate pulling device 6 and the filter plate handle 4 is snap-connected with each other, the plate pulling device 6 pulls the filter plate 3 to move to unload a filter cake. During this process, the plate pulling hook 62 of the plate pulling device 6 pulls the filter plate 3 to move, and when reaching the right side, the plate pulling hook 62 pushes a previous filter plate 3 and brings the current filter plate 3 and the previous filter plate 3 close to each other. Through the pushing on the plate pulling hook 62 by the compression spring 63, the plate pulling hook 62 pushes the filter plate 3 with a gentle force to prevent the filter plate 3 from rebounding. When the filter plates are being pushed together, one of the filter plates is pulled and others of the filter plates are pushed at the same time, the gap between the filter plates 3 is reduced, more filter plates 3 can be provided at the same length, the filter area is larger, and thus the processing capacity of the filter press is improved.

In order to optimize the recessed plate filter press for circularly pulling and pushing plates in the above embodiment to ensure the pulling effect of the plate pulling device 6 on the filter plate 3, the plate pulling device 6 includes a pulling plate frame 61, a compression spring 63, a chain pin shaft 64 and a first pin shaft 65, the plate pulling hook 62 is hinged with the plate pulling frame 61 through the chain pin shaft 64, a limiting through-hole 621 of the plate pulling hook 62 is hinged with the plate pulling frame 61 through the second pin shaft 66, one end of the compression spring 63 is connected with the plate pulling hook 62, the other end of the compression spring 63 is connected with the plate pulling frame 61, and the chain pin shaft 64 is used to connect the plate pulling frame 61 with the chain 9. The plate pulling device 6 further includes a second pin shaft 66, the limiting through-hole 621 of the plate pulling hook 62 is snap-connected with the second pin shaft 66 to limit a position; a limiting protrusion 623 for installing the compression spring 63 is provided on each of the plate pulling hook 62 and the plate pulling frame 61. The plate pulling hook 62 is hinged with the plate pulling frame 61 through the chain pin shaft 64, so that when the filter plate handle 4 depresses the plate pulling hook 62, the plate pulling hook 62 can rotate around the chain pin shaft 64, and the limiting through-hole 621 of the plate pulling hook 62 is hinged with the pull plate frame 61 through the second pin shaft 66, for the compression spring 63 to limit the plate pulling hook 62 when resetting the plate pulling hook 62, and a limit protrusion 623 is designed on a lower side of the plate pulling hook 62 to prevent the compression spring 63 from falling off. The process is specifically implemented by: when the plate pulling device 6 moves to a position that is below the filter plate handle 4, the plate pulling hook 62 of the plate pulling device 6 is depressed by the filter plate handle 4, and the plate pulling hook 62 rotates around the chain pin shaft 64 so that the plate pulling device 6 passes through a position that is below the filter plate handle 4. When the plate pulling device 6 moves to a position that is below the filter plate handle 4 of the outermost filter plates 3 of the multiple filter plates placed side by side, the plate pulling hook 62 of the plate pulling device 6 loses the restriction on the filter plate handle 4. Due to the existence of the compression spring 63, the plate pulling hook 62 of the plate pulling device 6 is reset upward, the plate pulling hook 62 is snap-connected with the filter plate handle 4 of the filter plate 3, and the plate pulling device 6 pulls the filter plate 3 to move in order to achieve the purpose of unloading the materials.

In the above embodiment, the limiting protrusion 623 is used to install the compression spring 63, and two ends of the compression spring 63 are respectively fixedly installed on the limiting protrusion 623.

It should be noted that the second pin shaft 66 slides along the limiting through-hole 621, so that the movement of the plate pulling hook 62 remains stable. It is certain that setting the limiting through-hole 621 in the middle of the plate pulling hook 62 can also reduce the overall weight of the plate pulling hook 62, which meets the requirements of a lightweight design.

Based on this, a transition surface 622, a hook protrusion 624 and an inclined surface of hook 625 are provided on the plate pulling hook 62, the transition surface 622 is located at a tail end of the plate pulling hook 62, and the hook protrusion 624 and the inclined surface of hook 625 are located at a front end of the plate pulling hook 62. When the plates are pulled and pushed together, the chain 9 drives the plate pulling device 6 to move, and the transition surface 622 of the plate pulling hook 62 contacts the filter plate handle 4 or the depressing frame 8, and the plate pulling hook 62 is depressed by the filter plate handle 4 or the depressing frame 8, so that the plate pulling hook 62 moves smoothly with the chain 9. Because the transition surface 622 has an inclined structural surface which can push the previous filter plate handle 4, so as to push the previous and current filter plates 3 together. When the depressing frame 8 moves outward with the push plate 7, the depressing frame 8 comes into contact with the inclined surface of hook 625 and gradually moves along the inclined surface of hook 625 to depress the plate pulling hook 62, so that the push plate 7 moves outward smoothly and prevents the depressing frame 8 from forming an impact and damage to the plate pulling hook 62. Certainly, a hook protrusion 624 is further provided on the plate pulling hook 62, which facilitates forming a stable hook with the filter plate handle 4 and driving the filter plate 3 to move.

Further, a circular shaft 42 is provided on the filter plate handle 4, and a shaft sleeve 45 is mounted on the circular shaft 42. During the process of the plate pulling hook 62 and the filter plate handle 4 becoming snap-connected, the plate pulling hook 62 of the plate pulling device 6 passes through a position that is below the filter plate handle 4, the rotating shaft sleeve 45 mounted outside the circular shaft 42 contacts with the plate pulling hook 62 of the plate pulling device 6, which facilitates the plate pulling device 6 passing through a position which is under the filter plate handle 4, and avoids the occurrence of the wear of the filter plate handle 4 and the plate pulling hook 62, thereby prolonging the service life of the filter plate handle 4 and the plate pulling device 6.

It should also be noted that a retaining ring 44 for fixing the shaft sleeve 45 is provided on the filter plate handle 4. The retaining ring 44 can fix the shaft sleeve 45 mounted on the circular shaft 42 to prevent the shaft sleeve 45 from falling out of the circular shaft 42, which may cause that the operation cannot proceeding properly.

It should be noted that the recessed plate filter press for circularly pulling and pushing plates further includes a chain frame 11 arranged on the main beam 1, and the chain 9 slides along the top of the chain frame 11; a bracket 12 is further provided on the main beam 1, and the bracket 12 is located below the chain frame 11, and an adjusting bolt 13 and a locking nut 14 are provided on the bracket 12. The chain frame 11 is provided to enable the chain 9 to run on the chain frame 11, to ensure the stability of running of the chain 9. The bracket 12 is arranged on the main beam 1, the bracket 12 is provided with an upward bolt-hole, through which the adjusting bolt 13 passes and is fastened by the locking nut 14, so that the height of the chain frame 11 and the chain 9 can be adjusted to suit different site conditions.

Second Embodiment

Figure 8:
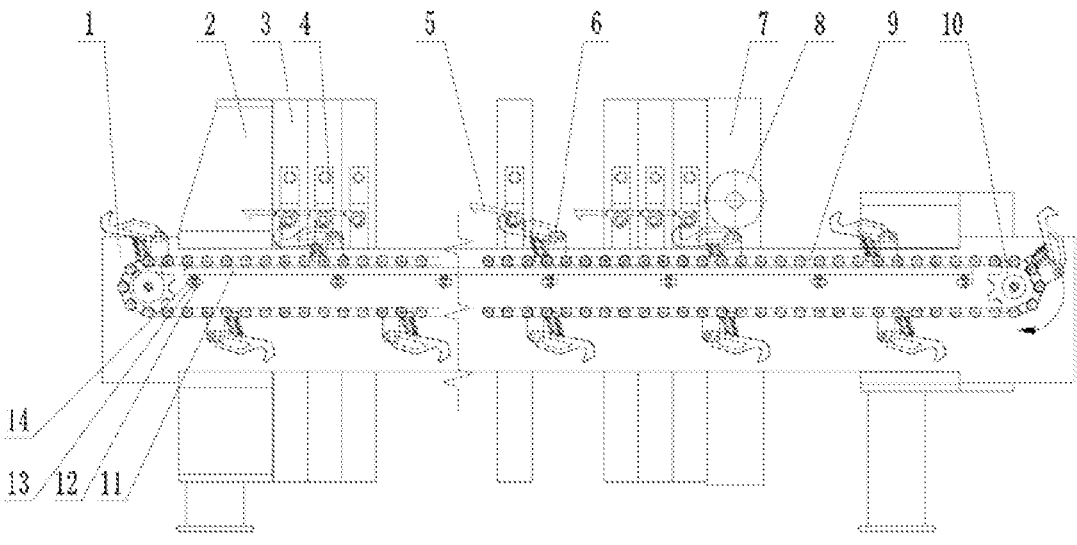
FIG. 8 is a schematic diagram of the overall structure of a specific implementation of a second embodiment according to the present application.
Figure 9:
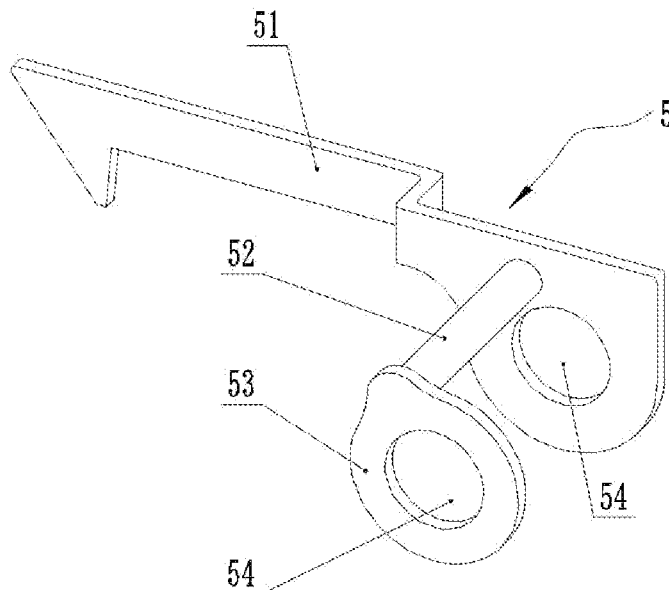
FIG. 9 is a schematic diagram of a plate locking device shown in FIG. 8.
Figure 10:
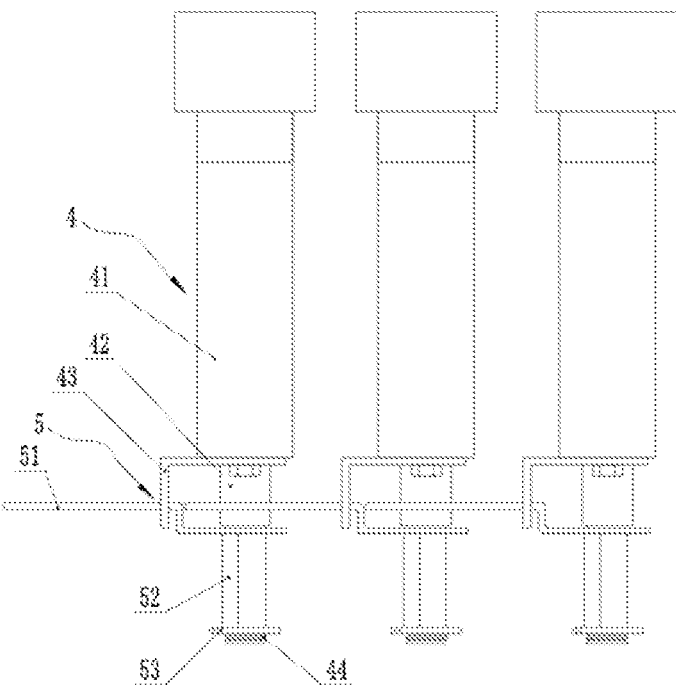
FIG. 10 is a top view of the installation of a plate locking device shown in FIG. 8.
Figure 11:
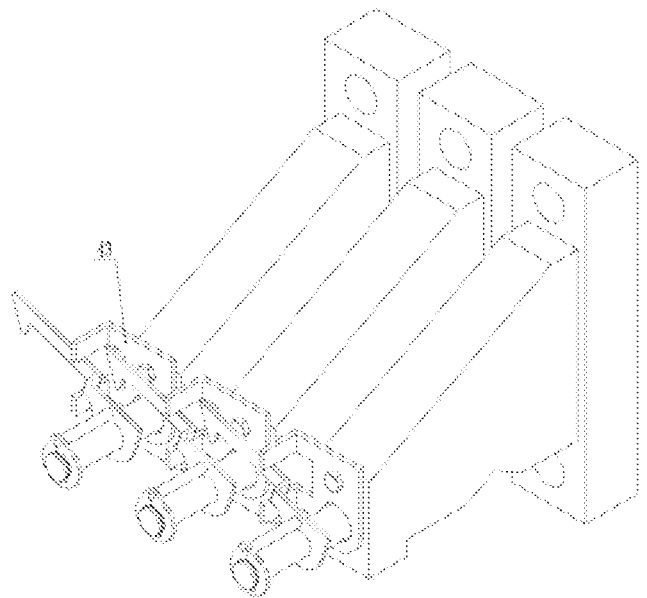
FIG. 11 is a perspective view of the installation of a plate locking device shown in FIG. 8.
Figure 12:
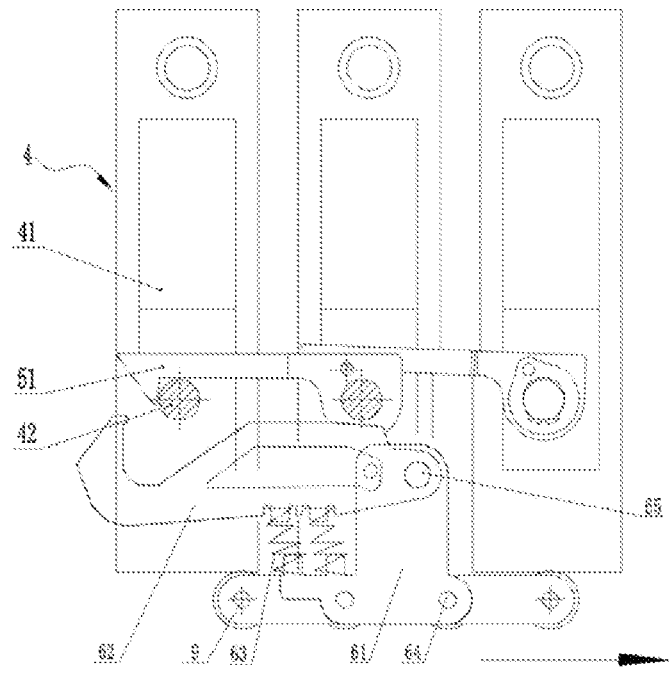
FIG. 12 is a schematic diagram of the operating state in which a plate pulling device is below a filter plate handle shown in FIG. 8.
Figure 13:
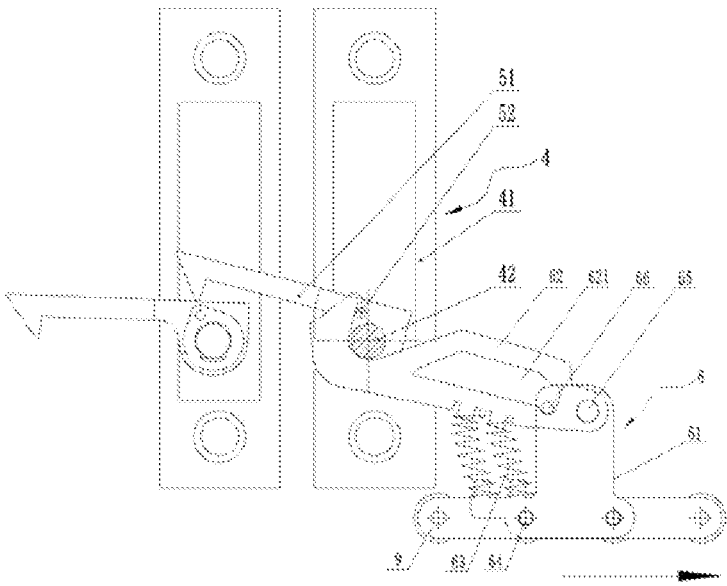
FIG. 13 is a schematic diagram of the operating state in which a plate pulling hook of a plate pulling device is hooked on a filter plate handle shown in FIG. 8.
Figure 14:
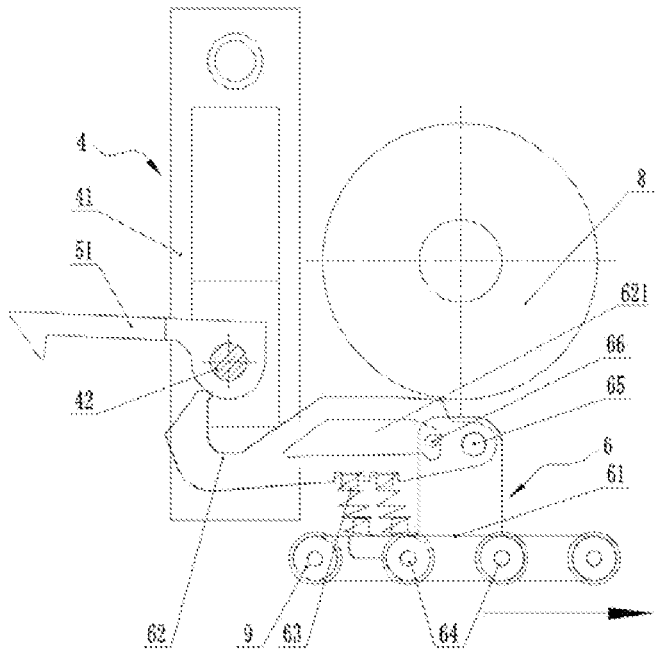
FIG. 14 is a schematic diagram of the operating state in which a plate pulling device touches a depressing frame shown in FIG. 8.
Figure 15:
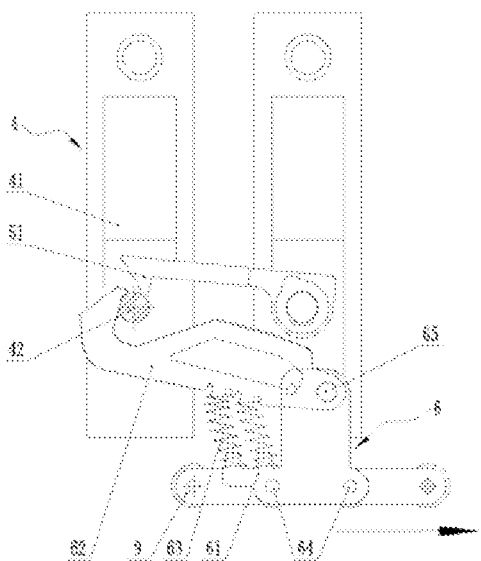
FIG. 15 is a schematic diagram of the operating state in which a plate locking hook of a plate locking device contacts a filter plate handle shown in FIG. 8.
Figure 16:
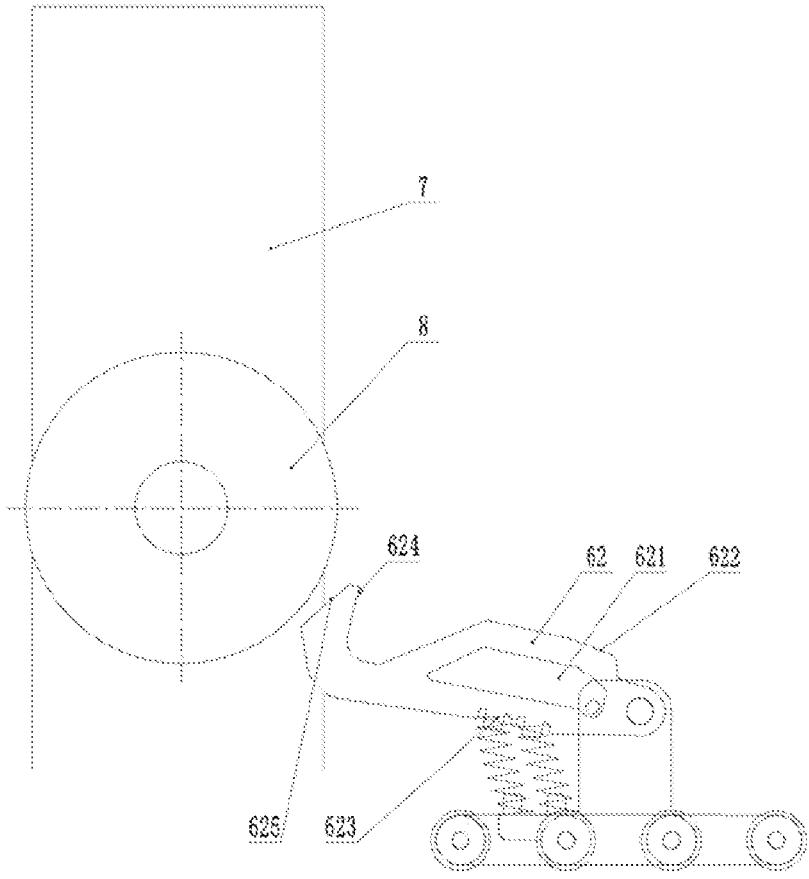
FIG. 16 is a schematic diagram of the operating state in which a push plate is pulled away shown in FIG. 8.

Reference is made to FIGS. 8 to 16. FIG. 8 is a schematic diagram of the overall structure of a specific implementation of a second embodiment according to the present application; FIG. 9 is a schematic diagram of a plate locking device shown in FIG. 8; FIG. 10 is a top view of the installation of a plate locking device shown in FIG. 8; FIG. 11 is a perspective view of the installation of a plate locking device shown in FIG. 8; FIG. 12 is a schematic diagram of the operating state in which a plate pulling device is below a filter plate handle shown in FIG. 8; FIG. 13 is a schematic diagram of the operating state in which a plate pulling hook of a plate pulling device is hooked on a filter plate handle shown in FIG. 8; FIG. 14 is a schematic diagram of the operating state in which a plate pulling device touches a depressing frame shown in FIG. 8; FIG. 15 is a schematic diagram of the operating state in which a plate locking hook of a plate locking device contacts a filter plate handle shown in FIG. 8; and FIG. 16 is a schematic diagram of the operating state in which a push plate is pulled away shown in FIG. 8. The arrow in FIGS. 8 to 14 indicates a direction of movement.

In a specific implementation of a second embodiment according to the present application, a main beam 1, multiple sprockets 10, a chain 9, a depressing frame 8, multiple plate pulling devices 6, multiple plate locking devices 5, multiple filter plates 3 and filter plate handles 4 are mainly included, the multiple sprockets 10 are arranged on both ends of the main beam 1, the chain 9 is installed on the multiple sprockets 10, the filter plate handles 4 are arranged on both sides of the multiple filter plates 3, the multiple plate pulling devices 6 are arranged apart on the chain 9, and the multiple plate locking devices 5 are respectively arranged on the multiple filter plate handles 4, the depressing frame 8 is arranged on a push plate 7, a plate pulling hook 62 of each plate pulling device 6 is snap-connected with a connecting rod 52 of each plate locking device 5, and a plate locking hook 51 of the plate locking device 5 is snap-connected with a circular shaft 42 of the filter plate handle 4.

The multiple sprockets 10 are arranged on both ends of the main beam 1, the chain 9 is installed on the multiple sprockets 10, the multiple sprockets 10 are used to drive the chain 9 to rotate, the multiple filter plate handles 4 are arranged on both sides of the multiple filter plates 3, and the filter plate handle 4 is used to drive the filter plate 3 to move, the plate pulling device 6 is arranged apart on the chain 9, the multiple plate locking devices 5 are respectively arranged on the multiple filter plate handles 4, the plate pulling device 6 is used to cooperate with the plate locking device 5 to pull the filter plate 3, the depressing frame 8 is arranged on the push plate 7, the push plate 7 is used to block the filter plate 3 for which the materials are unloaded from further moving, the plate pulling hook 62 of the plate pulling device 6 is snap-connected with the connecting rod 52 of the plate locking device 5, and the plate locking hook 51 of the plate locking device 5 is snap-connected with the circular shaft 42 of the filter plate handle 4.

The plate locking device 5 is provided on a side of the filter plate handle 4, the plate pulling hook 62 of the plate pulling device 6 is snap-connected with the connecting rod 52 of the plate locking device 5, and the plate locking hook 51 of the plate locking device 5 is snap-connected with the circular shaft 42 of the filter plate handle 4. By providing the plate locking device 5 on a side of the filter plate handle 4, in the actual operation process, a power source drives the multiple sprockets 10 to rotate, the sprocket 10 drives the chain 9 installed on the sprocket 10 to rotate cyclically, and the chain 9 drives the plate pulling device 6 installed on the chain 9 to move, and the plate pulling hook 62 of the plate pulling device 6 moved from an end of the thrust plate 2 is depressed by the circular shaft 42 on the filter plate handle 4, and the plate pulling device 6 passes through a position that is below the filter plate handle 4. When the plate pulling device 6 moves to a position that is below the filter plate handle 4 of the outermost filter plate 3 of the multiple filter plates placed side by side, the circular shaft 42 of the filter plate handle 4 loses the restriction on the plate pulling hook 62, the plate pulling hook 62 is reset and hook the connecting rod 52 of the plate locking device 5 and the circular shaft 42 of the handle of filter plate 4, and the plate pulling hook 62 of the plate pulling device 6 and the connecting rod 52 of the plate locking device 5 is snap-connected with each other. Prior to this, the plate locking hook 51 of the plate locking device 5 is snap-connected with the circular shaft 42 of the filter plate handle 4. Because the plate pulling hook 62 is reset, the connecting rod 52 is forced to drive the plate locking hook 51 to be lifted up, and the plate locking hook 51 is unlocked with the previous filter plate handle 4. In this way, the plate pulling device 6 pulls the filter plate 3 to move in order to unload a filter cake. During this process, the plate pulling hook 62 of the plate pulling device 6 pulls the filter plate 3 to move, and when reaching the right side, the plate pulling hook 62 pushes the previous filter plate 3 and brings the current filter plate 3 and the previous filter plate 3 close to each other. Through the pushing on the plate pulling hook 62 by the compression spring 63, the plate pulling hook 62 pushes the filter plate 3 with a gentle force, to prevent the filter plate 3 from rebounding. When the filter plates are being pushed together, one of the filter plates is pulled and others of the filter plates are pushed at the same time, the plate locking device 5 plays a role in making the filter plates 3 compact, the gap between the filter plates is reduced, more filter plates 3 can be provided at the same length, the filter area is larger, and thus the processing capacity of the filter press is improved.

It should be noted that the limiting protrusions 623 are used to install the compression spring 63, and the number of compression spring 63 is two, which results in a softer elasticity and a reduced impact.

It should be noted that, for the connection structure of the plate locking device 5 and the filter plate handle 4, a circular hole 54 for mating and connecting with the circular shaft 42 is provided on each of the bracket 53 of the plate locking device 5 and the plate locking hook 51. The bracket 53 is provided at a position perpendicular to a vertical plane where the plate locking hook 51 is located, and a circular hole 54 for mating and connecting with the circular shaft 42 is provided on an end of the bracket 53 and the plate locking hook 51, so that the plate locking device 5 is mounted on the circular shaft 42 of the filter plate handle 4 to form the connection structure of the plate locking device 5 and the filter plate handle 4, and the plate locking device 5 can rotate around the circular shaft 42 of the filter plate handle 4 to realize the plate locking device 5 disengaging with the previous filter plate 3.

It should be noted that a positioning frame 43 is provided on the filter plate handle 4, and an upper stop plate and a lower stop plate are provided on the positioning frame 43. The upper stop plate and the lower stop plate are used to define the range of rotation motion of the plate locking device 5, the upper stop plate and the lower stop plate of the positioning frame 43 define the position of the plate locking hook 51, the upper stop plate prevents the plate locking hook 51 from being lifted up, and the lower stop plate prevents the plate locking hook 51 from sagging, so that the plate locking device 5 can operate within the normal operating range to ensure the normal operation of the filter press.

It should also be noted that the retaining ring 44 on the filter plate handle 4 can further fix the plate locking device 5 on the circular shaft 42 to prevent the plate locking device 5 from falling out of the circular shaft 42, which may cause that the operation cannot proceeding properly. Certainly, in this solution, a shaft sleeve 45 can be added between the plate locking device 5 and the circular shaft 42, and the shaft sleeve in this embodiment has the same function as the shaft sleeve in the first embodiment.

Finally, the depressing frame 8 is a depressing wheel, each of the two sides of the depressing frame 8 has an upturned inclined surface and the middle has a horizontal plane. When the plate pulling device 6 pulls the filter plate handle 4 and moves to an end of the push plate 7, the plate pulling hook 62 is depressed by the depressing frame 8, the plate pulling hook 62 is disengaged from the circular shaft 42 of the filter plate handle 4, and the plate pulling device 6 passes through a position that is below the depressing frame 8. In addition, for the filter plate 3 brought by the plate pulling device 6 subsequently, the plate pulling device 6 is decoupled through the circular shaft 42 of the filter plate handle 4 on the previous filter plate 3. It should also be noted that the plate pulling hook 62 is subjected to a relatively large impact when it passes through the depressing frame 8. After optimization of the field test, the depressing frame 8 is a cylindrical depressing wheel, and the depressing wheel can rotate around the central axis to reduce the impact and improve the service life. Certainly, the depressing frame 8 can be a diamond-shaped depressing wheel, which also has the characteristic of rotating around the central axis. The depressing frame 8 can also be designed in other columnar structures.

In summary, the recessed plate filter press for circularly pulling and pushing plates according to this embodiment mainly includes the main beam, the thrust plate, the multiple filter plates, a filter plate handles, the filter plate handle plate pulling devices, the push plate, the depressing frame, the chain and the multiple sprockets, the thrust plate is arranged on the main beam, the multiple sprockets re arranged at both ends of the main beam, the chain is installed on the multiple sprockets, the multiple filter plate handles are arranged on both sides of the multiple filter plates, the multiple plate pulling devices are arranged apart on the chain, the depressing frame is arranged on the push plate, the plate pulling hook of each plate pulling device is snap-connected with the filter plate handle. A power source drives the multiple sprockets to rotate, the multiple sprockets drive the chain installed on the multiple sprockets to rotate circularly, and the chain drives the plate pulling device installed on the chain to move, the plate pulling hook of the plate pulling device moved from an end of the thrust plate will be depressed by the filter plate handle, the plate pulling device passes through a position that is below the filter plate handle. When the plate pulling device moves to a position which is below the filter plate handle of the outermost filter plate of filter plates placed side by side, the filter plate handle loses the restriction on the plate pulling hook, the plate pulling hook is reset and then hooks the filter plate handle, the plate pulling hook of the plate pulling device and the filter plate handle is snap-connected with each other, the plate pulling device pulls the filter plate to move in order to unload a filter cake. During this process, the plate pulling hook of the plate pulling device pulls the filter plate to move, and when reaching the right side, the plate pulling hook pushes the previous filter plate and brings the current filter plate and the previous filter plate close to each other. Through the pushing on the plate pulling hook by the compression spring, the plate pulling hook pushes the filter plate with a gentle force, to prevent the filter plate from rebounding. When the filter plates are being pushed together, one of the filter plates is pulled and others of the filter plates are pushed at the same time, the gap between the filter plates is reduced, more filter plates can be provided at the same length, the filter area is larger, and thus the processing capacity of the filter press is improved.

According to the above description of the disclosed embodiments, those skilled in the art can implement or practice the present application. Various modifications to the embodiments are apparent to the person skilled in the art, and the general principle defined herein can be implemented in other embodiments without departing from the spirit or scope of the present application. Hence, the present disclosure is not limited to the embodiments disclosed herein, but is to conform to the widest scope in accordance with the principles and novel features disclosed herein.

What is claimed is:

1. A recessed plate filter press for circularly pulling and pushing plates, comprising: a main beam, a thrust plate, a plurality of filter plates, a plurality of filter plate handles, a plurality of plate pulling devices, a push plate, a depressing frame, a chain and a plurality of sprockets, wherein the thrust plate is arranged on the main beam, the plurality of sprockets is arranged on both ends of the main beam, the chain is installed on the plurality of sprockets, the plurality of filter plate handles is respectively arranged on both sides of the plurality of filter plates, the plurality of plate pulling devices is arranged apart on the chain, the depressing frame is arranged on the push plate, and a plate pulling hook of each plate pulling device is configured to be snap-connected with one filter plate filter plate handle, wherein each plate pulling device comprises a plate pulling frame, a compression spring, a chain pin shaft and a first pin shaft, the plate pulling hook is hinged with the plate pulling frame through the first pin shaft, one end of the compression spring is connected with the plate pulling hook, the other end of the compression spring is connected with the plate pulling frame, and the chain pin shaft is used to connect the plate pulling frame with the chain, wherein the plate pulling device further comprises a second pin shaft, and a limiting through-hole of the plate pulling hook is snap-connected with the second pin shaft to limit a position, wherein a limiting protrusion for installing the compression spring is provided on each of the plate pulling hook and the plate pulling frame, wherein a transition surface, a hook protrusion and an inclined surface of hook are provided on the plate pulling hook, the transition surface is located at a tail end of the plate pulling hook, and the hook protrusion and the inclined surface of hook are located at a front end of the plate pulling hook, wherein a circular shaft is provided on each filter plate handle, and a shaft sleeve is sleeved on the circular shaft, wherein a retaining ring for fixing the shaft sleeve is further provided on each filter plate handle.

2. The recessed plate filter press for circularly pulling and pushing plates according to claim 1, further comprising: a chain frame arranged on the main beam, wherein the chain slides along the top of the chain frame.

3. The recessed plate filter press for circularly pulling and pushing plates according to claim 2, wherein a bracket is further provided on the main beam and the bracket is located below the chain frame, and an adjusting bolt and a locking nut are provided on the bracket.

4. The recessed plate filter press for circularly pulling and pushing plates according to claim 3, wherein the depressing frame is a depressing wheel.

5. The recessed plate filter press for circularly pulling and pushing plates according to claim 2, wherein a plate locking device is provided on a side of each filter plate handle, the plate pulling hook of the plate pulling device is snap-connected with a connecting rod of the plate locking device, and a plate locking hook of the plate locking device is snap-connected with a circular shaft of the filter plate handle.

6. The recessed plate filter press for circularly pulling and pushing plates according to claim 5, wherein a positioning frame is provided on the filter plate filter plate handle, and an upper stop plate and a lower stop plate are provided on the positioning frame.

* * * * *